United States Patent [19]

McInerney

[11] Patent Number: 4,463,564
[45] Date of Patent: Aug. 7, 1984

[54] TURBOCHARGER TURBINE HOUSING ASSEMBLY

[75] Inventor: Charles E. McInerney, Los Angeles, Calif.

[73] Assignee: The Garrett Corporation, Los Angeles, Calif.

[21] Appl. No.: 314,214

[22] Filed: Oct. 23, 1981

[51] Int. Cl.³ .............................................. F02B 37/00
[52] U.S. Cl. ..................................... 60/602; 137/892; 415/144
[58] Field of Search ................. 60/600, 601, 602, 603; 415/144; 137/605, 893, 894, 892

[56] References Cited

U.S. PATENT DOCUMENTS

| | | | |
|---|---|---|---|
| 2,462,097 | 2/1949 | Heinz | 60/602 |
| 2,485,655 | 10/1949 | Polk . | |
| 2,629,541 | 2/1953 | Couture . | |
| 2,710,522 | 6/1955 | Jorgensen et al. . | |
| 2,731,792 | 1/1956 | Nallinger | 60/602 |
| 3,035,408 | 5/1962 | Silver . | |
| 3,089,304 | 5/1963 | Bozzola . | |
| 3,102,382 | 9/1963 | Bozzola . | |
| 3,104,520 | 9/1963 | Cazier et al. . | |
| 3,233,403 | 2/1966 | MacInnes . | |
| 3,365,878 | 1/1968 | Powell et al. . | |
| 4,084,378 | 4/1978 | Blake . | |
| 4,098,085 | 7/1978 | McDowell . | |
| 4,100,742 | 7/1978 | Harp, Jr. . | |
| 4,120,156 | 10/1978 | McInerney . | |
| 4,157,834 | 6/1979 | Burdette . | |
| 4,169,355 | 10/1979 | Walsham et al. . | |
| 4,171,936 | 10/1979 | Hageman et al. . | |
| 4,177,006 | 12/1979 | Nancarrow . | |
| 4,211,081 | 7/1980 | Yamada . | |
| 4,245,953 | 1/1981 | Milton | 60/602 |
| 4,251,050 | 2/1981 | McInerney . | |
| 4,256,019 | 3/1981 | Braddick . | |

FOREIGN PATENT DOCUMENTS

| | | | |
|---|---|---|---|
| 575989 | 3/1946 | United Kingdom | 60/600 |
| 2054055 | 2/1981 | United Kingdom | 60/602 |

*Primary Examiner*—Douglas Hart
*Attorney, Agent, or Firm*—Stuart O. Lowry; Albert J. Miller

[57] ABSTRACT

A turbine housing assembly for use in a turbocharger having an exhaust gas driven turbine wheel for rotatably driving a compressor impeller. The assembly includes a turbine housing having an exducer passage into which exhaust gases are discharged from the turbine wheel. A bypass passage in the turbine housing and a pivoting wastegate valve cooperate to provide an efficient exhaust ejector for drawing gases through the exducer passage to reduce back-pressure on the engine. The turbine housing further includes an air vent for circulation of cooling air between the bypass and exducer passages.

37 Claims, 4 Drawing Figures

TURBOCHARGER TURBINE HOUSING ASSEMBLY

BACKGROUND OF THE INVENTION

This invention relates generally to improvements in turbochargers of the type used to provide pressurized air to an internal combustion engine. More particularly, this invention relates to a turbine housing assembly designed for improved cooling of metal portions exposed to hot engine exhaust gases and having a wastegate valve and a bypass passage which cooperate to provide an efficient exhaust ejector to reduce backpressure on the engine.

Turbochargers in general are well known in the art for supplying relatively high pressure air, commonly referred to as charge air, to the intake manifold of an internal combustion engine such as a reciprocating piston engine of the type commonly used to power automobiles, trucks, buses, and the like. Typically, the turbocharger comprises a turbine housing connected for receiving exhaust gases expelled from the engine and configured for guiding those exhaust gases into driving communication with a rotatable turbine wheel. The turbine wheel is carried by a rotatable shaft commonly connected to a compressor impeller within a compressor housing. The turbine wheel thus rotatably drives the impeller which in turn draws ambient air into the compressor housing for compression and discharge in the form of charge air for supply to the intake manifold of the engine.

Turbocharged engines are highly advantageous when compared with conventional naturally aspirated engines in that substantially denser air is delivered to the combustion chamber or cylinders of the engine. This increased air density, or mass, permits the engine to be operated at substantially increased levels of performance and power output, and frequently with greater efficiency. However, with many combustion engines, it is desirable to control operation of the turbocharger so that the charge air is supplied to the engine only on demand and at a pressure level not exceeding predetermined design limits. In this regard, a variety of control schemes are known such as, for example, the provision of a bypass passage for nondriving bypass flow of a portion of the exhaust gases around the turbine wheel in combination with a so-called wastegate valve for opening and closing the bypass passage in response to selected engine parameters. For examples of wastegate valve control schemes, see U.S. Pat. Nos. 3,035,408; 4,120,156; 4,177,006; 4,251,050; and 4,256,019.

In most turbochargers, particularly of the type used with relatively small automobile engines, it is highly desirable to minimize the number of component parts in order to reduce overall manufacturing and material cost. In this regard, it is known to form the turbine housing of the turbocharger from a single component, typically a metal casting, to include an inlet passage for receiving exhaust gases, a volute passage for communicating the exhaust gases to a turbine wheel, an exducer passage through which the exhaust gases are discharged, and the bypass passage communicating between the inlet and exducer passages. These various passages are defined, for the most part, by metal surfaces exposed on one side to the hot exhaust gases and on the other side to ambient air which tends to cool the housing sufficiently to prevent heat degradation of the metal. However, in a unitarily cast turbine housing of this type, a relatively small region of metal separating the bypass passage from the volute and exducer passages is surrounded at all times by hot exhaust gases, whereby this region of metal has been found to degrade quickly from exposure to heat.

In addition to the foregoing, an inherent disadvantage arising from use of a turbocharger with a combustion engine is that the turbocharger necessarily restricts passage of the exhaust gases expelled from the engine and thereby results in an increase in backpressure or load acting upon the engine. This increase in backpressure is present for all conditions of engine operation since at least some of the exhaust gases flow into driving communication with the turbine wheel even when the wastegate valve is fully open. This backpressure can adversely affect engine performance particularly when the wastegate valve is open and it is desired to operate the engine in a normal unboosted mode.

Some turbocharger systems have been proposed seeking to minimize the adverse effects of increased backpressure acting upon the engine. See, for example, U.S. Pat. No. 3,104,520 wherein a bypass passage is oriented for flow of exhaust gases in a downstream direction within a turbine outlet passage. When a wastegate valve is opened, the bypassed gas flow provides a so-called fluid ejector creating a localized region of decreased fluid pressure at the downstream side of the turbine, wherein this decreased fluid pressure advantageously draws gases through the turbine housing to result in a reduction in backpressure acting upon the engine. While systems of this general type offer improvements over conventional wastegate valve schemes, they have not optimized the fluid ejector design, particularly with regard to the wastegate valve which impedes gas flow through the bypass passage.

The present invention overcomes the above-described problems and disadvantages by providing an improved turbocharger turbine housing assembly including a wastegate valve and bypass passage designed to form an efficient fluid ejector wherein the wastegate valve does not restrict or impede exhaust gas flow and further including an air vent for improved cooling of the portion of the turbine housing between the bypass and the exducer passages.

SUMMARY OF THE INVENTION

In accordance with the invention, a turbine housing assembly is provided for use with a turbocharger having a turbine wheel and a compressor impeller mounted on a common shaft and carried respectively within a turbine housing and a compressor housing. The turbine housing is adapted for coupling to the exhaust gas manifold of a combustion engine for communicating exhaust gases into driving communication with the turbine wheel, which in turn rotatably drives the compressor impeller to draw in and compress ambient air for supply to the intake manifold of the engine. According to the invention, the turbine housing includes a bypass passage which is selectively opened and closed by a wastegate valve to permit a portion of the exhaust gases to bypass the turbine wheel, wherein the bypass passage is oriented to open in a downstream direction into a turbine housing exducer passage to provide a fluid ejector, and wherein the wastegate valve is pivoted to an open position allowing substantially unimpeded exhaust gas flow through the bypass passage. In addition, the turbine housing is formed to include an air vent for passage of cooling ambient air generally between metal surfaces of the housing separating the bypass and the exducer passages.

According to one preferred form of the invention, the turbine housing comprises a unitary casting shaped to include an inlet passage for receiving exhaust gases, a volute passage for communicating the exhaust gases with the turbine wheel, the exducer passage through which the exhaust gases are discharged, and the bypass passage communicating generally between the inlet and exducer passages. The bypass passage opens into one side of the exducer passage and is shaped to direct bypassed exhaust gases from the inlet passage generally in a downstream direction within the exducer passage. With this construction, exhaust gas flow through the bypass passage enters the exducer passage at a relatively high velocity and flows in a downstream direction within the exducer passage to provide a fluid ejector which decreases locally the fluid pressure in the exducer passage. This fluid pressure reduction tends to draw exhaust gases through the turbine housing to decrease fluid pressure at the turbine inlet passage and thereby also decrease backpressure acting upon the engine.

A swing-type wastegate valve is provided for selectively opening and closing the bypass passage to control the flow of exhaust gases therethrough. This wastegate valve comprises a valve head carried by a crank arm mounted on a rotatable actuator shaft for pivoting the crank arm between a first position with the valve head closing the bypass passage and a second position with the valve head opening the bypass passage. Importantly, the actuator shaft is positioned within the exducer passage generally adjacent the juncture of the exducer and bypass passages and generally between the bypass passage and the turbine wheel, such that the valve head pivots to the second or open position in a direction permitting substantially unimpeded flow of exhaust gases through both the bypass and the exducer passages.

In addition, according to a preferred form of the turbine housing, the exducer passage has a first portion generally in axial alignment with the turbine wheel rotational axis for guiding expelled exhaust gases into a second, angularly extending portion which in turn guides the exhaust gases toward an outlet opening. The bypass passage opens into the second, angularly extending portion of the exducer passage to face in a generally downstream direction and for relatively free flow of bypassed exhaust gases through the outlet opening. The wastegate valve actuator shaft is mounted within the second angularly extending portion of the exducer passage at a position displaced axially from the turbine wheel such that the wastegate valve does not substantially impede flow of exhaust gases through the exducer passage regardless of the operative position of the valve head.

The turbine housing further includes an air vent cast therein and positioned generally between the exducer and bypass passages. This air vent permits circulation of cooling ambient air between metal surfaces of the turbine housing separating the exducer and bypass passages to prevent degradation of the metal surfaces from exposure to the hot exhaust gases.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
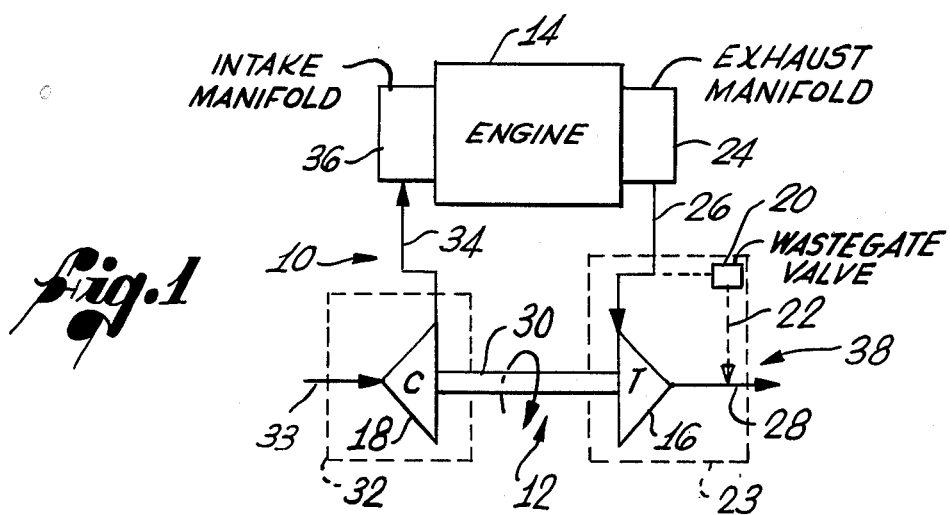
FIG. 1 is a schematic diagram illustrating a turbocharged engine system.

A turbocharged engine system 10 is illustrated generally in FIG. 1 to include an exhaust gas driven turbocharger 12 in combination with a combustion engine 14. The turbocharger 12 includes a turbine wheel 16 which is rotatably driven by exhaust gases expelled from the engine to drive a compressor impeller 18 which in turn supplies compressed air, commonly referred to as charge air, to the engine. Control over turbocharger operation is provided by a wastegate valve 20 for selectively permitting a portion of the exhaust gases to bypass the turbine 16 through a bypass passage 22, all in a well-known manner. Importantly, according to the invention, the wastegate valve 20 and the bypass passage 22 cooperate to define an efficient fluid ejector for reducing backpressure acting upon the engine. Moreover, the bypass passage 22 is advantageously incorporated into a unitarily cast turbine housing 23 which includes an air vent (not shown in FIG. 1) for passage of cooling ambient air into contact with specific metal surfaces of the turbine housing to prevent degradation of portions of the turbine housing from exposure to hot exhaust gases.

More particularly, the engine 14 comprises an internal combustion engine such as, for purposes of illustration, a reciprocating piston engine of the type used commonly with passenger automobiles or the like. The engine 14 has an exhaust manifold 24 through which products of combustion in the form of exhaust gases are expelled for passage through an exhaust conduit 26 to the turbine housing 23. The exhaust gases flow into the turbine housing 23 for passage into driving communication with the turbine wheel 16 to rotate the turbine wheel at a relatively high speed, typically on the order of up to about 100,000 rpm and higher. After expansion by the rotating turbine wheel 16, the exhaust gases are discharged to atmosphere through an outlet conduit 28 which may include conventional pollution and/or noise abatement devices (not shown).

The turbine wheel 16 is carried at one end of a rotatable shaft 30 which is in turn connected at its opposite end to the compressor impeller 18. Accordingly, driving rotation of the turbine wheel 16 imparts via the shaft 30 a corresponding rotation to the compressor impeller. As illustrated in FIG. 1, the compressor impeller 18 is positioned within a compressor housing 32 to draw in ambient air through an inducer passage 33 and to compress the ambient air for supply as charge air through a discharge conduit 34 to an intake manifold 36 of the engine 14. Importantly, specific construction details of the shaft 33, the compressor impeller 18, and the compressor housing 32 are generally conventional in the art and thus are not shown or described in detail herein. However, for a more detailed description and discussion of exemplary construction details for a turbocharger, see commonly assigned U.S. Pat. Nos. 4,120,156 and 4,157,834, which are incorporated by reference herein.

The rotational speed of the turbine wheel 16, and hence the pressure of charge air supplied by the compresor impeller 18, is controlled by regulating the flow of exhaust gases through the bypass passage 22 away from driving communication with the turbine wheel. That is, during some conditions of engine operation, the exhaust gases expelled from the engine 14 are capable of driving the turbine wheel 16 at a speed sufficient to provide charge air to the engine at a pressure exceeding engine requirements or safe mechanical design limits. Alternatively, it may be desirable during some conditions to operate the engine in a normal or unboosted mode wherein the charge air has a pressure substantially equal to atmospheric pressure. In either event, control over turbocharger operation is obtained by the wastegate valve 20 which is movable to a position opening the bypass passage 22 to flow of exhaust gases whereby the mass flow of gases in driving communication with the turbine wheel 16 is reduced in proportion to the degree of opening of the valve. This movement of the wastegate valve is commonly controlled in response to selected system operating parameters such as, for example, the pressure of the charge air in the discharge conduit 34. For a detailed discussion of exemplary wastegate control schemes and apparatus therefor, see commonly assigned U.S. Pat. Nos. 4,251,050 and 4,256,019, which are incorporated by reference herein.

According to the invention, the turbine housing 23 including the bypass passage 22 cooperates with the wastegate valve 20 to provide an improved turbine housing assembly 38. More specifically, the bypass passage 22 and the wastegate valve 20 cooperate to provide an efficient fluid ejector for causing exhaust gases to be drawn through the turbine housing when the wastegate valve is open. This drawing of exhaust gases through the turbine housing advantageously results in a reduction of fluid pressure at the engine exhaust manifold 24 to reduce backpressure acting upon the engine by virtue of the presence of the turbocharger. Reduction in backpressure increases the overall engine pressure differential to permit the engine 14 to be operated with improved power output and economy.

Figure 2:
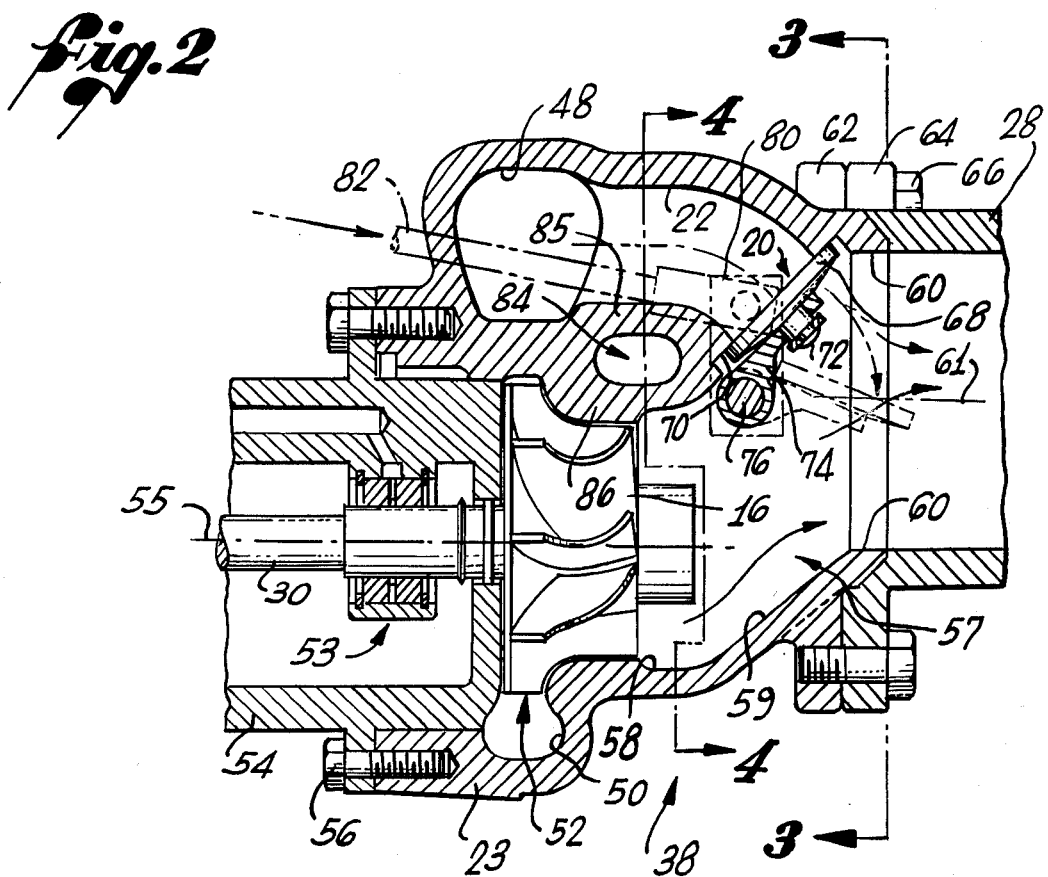
FIG. 2 is an enlarged fragmented cross-sectional view of a portion of a turbocharger illustrating the turbine housing assembly of this invention.
Figure 3:
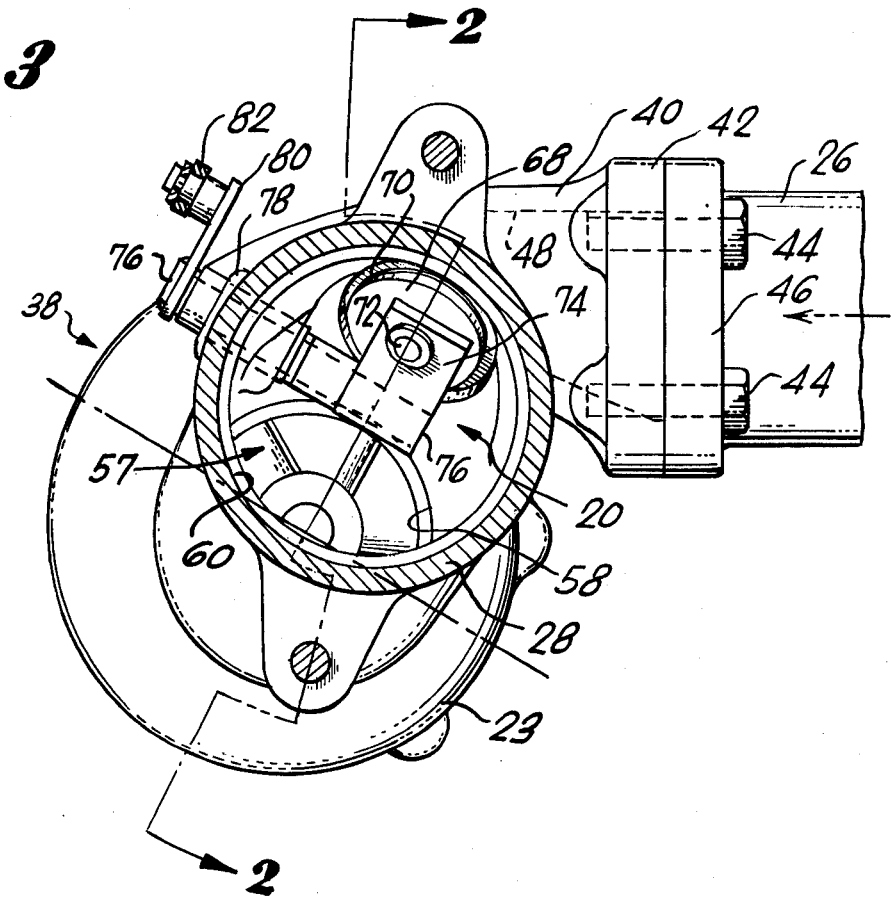
FIG. 3 is a vertical section taken generally along the line 3—3 of FIG. 2.
Figure 4:
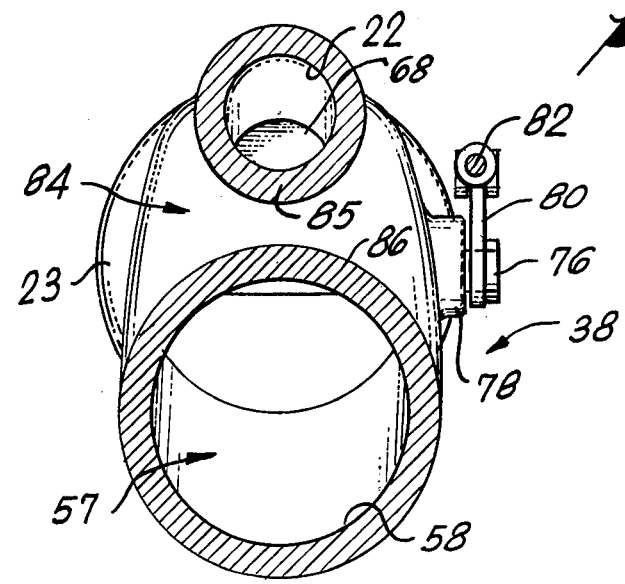
FIG. 4 is a vertical section taken generally on the line 4—4 of FIG. 2.

The turbine housing assembly 38 of this invention is shown in detail in FIGS. 2-4 which illustrate a preferred construction for the turbine housing 23 in combination with the wastegate valve 20. As illustrated, the turbine housing 23 is formed as a one-piece, unitary casting from a suitable metal material or the like generally capable of withstanding temperatures of engine exhaust gases and thermal cycling encountered by engine start-up and shutdown. This turbine housing 23 is shaped to include a plurality of internal passages for receiving the turbine wheel 16 and for guiding exhaust gases from the exhaust conduit 26 into driving communication with the turbine wheel prior to discharge through the outlet conduit 28. More particularly, the turbine housing 23 includes an inlet neck 40 (FIG. 3) with an external flange 42 adapted for connection as by bolts 44 to a mating flange 46 at the downstream end of the exhaust conduit 26. This inlet neck 40 defines an inlet passage 48 into which the engine exhaust gases flow toward driving communication with the turbine wheel 16.

The exhaust gases within the turbine housing inlet passage 48 flow freely into a generally annular volute passage 50 of gradually decreasing cross section. This volute passage 50 is open radially inwardly over a substantial portion of its length to define a turbine inlet nozzle 52, as viewed in FIG. 2, for passage of the exhaust gases into driving communication with the turbine wheel 16. The exhaust gases thus impact with the turbine wheel 16 to rotatably drive the turbine wheel and the rotatable shaft 30. This shaft 30, as shown in FIG. 2, is supported for rotation within one or more bearing assemblies 53 including journal and/or thrust bearings carried by a conventional center housing 54 which is secured in a suitable manner to the inboard side of the turbine housing 23 as by means of connecting bolts 56.

The driving exhaust gases are discharged from the turbine wheel 16 in an axial direction into an exducer passage 57 formed within the turbine housing 23. This exducer passage 57 has a generally circular cross section and guides the expelled exhaust gases away from the turbine wheel initially through a relatively short portion 58 generally in axial alignment with the rotational axis 55 of the turbine wheel and then through an angularly extending portion 59 toward an outlet opening 60 in the turbine housing wherein this outlet opening is aligned with a central axis 61 of the outlet conduit 28 and is axially offset with respect to the axially extending portion 58 of the exducer passage. Thus, the exhaust gases flow further through the outlet opening 60 into the upstream end of the outlet conduit 28. Conveniently, mating flanges 62 and 64 are formed on the turbine housing 23 and the outlet conduit 28 to facilitate connection of the components to each other by a series of bolts 66.

The bypass passage 22 is also formed within the turbine housing 23 and comprises a flow path of generally circular cross section extending from the inlet passage 48 to the exducer passage 57. Accordingly, the bypass passage 22 permits bypass flow of a portion of the exhaust gases through the turbine housing without driving communication with the turbine wheel. The wastegate valve 20 is positioned generally at the downstream end of the bypass passage 22 to selectively open and close the bypass passage and thereby control operation of the turbocharger.

The bypass passage 22 is specifically configured to inject the bypassed exhaust gases angularly into the exducer passages with a significant component of velocity directed generally in a downstream direction within the exducer passage. More specifically, the bypass passage extends from the inlet passage 48 in an axial direction generally in parallel with the rotational axis of the turbine wheel 16, and then turns angularly toward the exducer passage 57. The bypass passage 22 terminates at a position opening into the angularly extending portion 59 of the exducer passage and facing generally in a downstream direction for flow of bypassed exhaust gases directly through the outlet opening 60 into the outlet conduit 28.

With this geometry, the bypassed exhaust gases are injected in a generally downstream direction into the exducer passage 57 to create a fluid ejector with a relatively decreased fluid pressure within the exducer passage. More specifically, the bypassed exhaust gases have a relatively high velocity and energy level as compared with the gases flowing from the turbine wheel 16 whereby the bypassed gases tend to draw gases from the turbine wheel. This, in turn, tends to draw exhaust gases through the turbine housing inlet passage 48 to reduce the fluid pressure thereat and correspondingly reduce the fluid pressure within the exhaust conduit 26 and the engine exhaust manifold 24. Such pressure reduction at the exhaust manifold 24 constitutes a reduction in backpressure acting upon the engine to permit the engine to be operated with increased power and efficiency.

The wastegate valve 20 is designed to permit the desired fluid ejector operation with optimum efficiency, while at the same time providing accurate control of turbocharger operation. More specifically, the wastegate valve 20 comprises a disk-shaped valve head 68 sized for seated reception on a valve seat 70 at the downstream end of the bypass passage 22 to close the bypass passage, wherein this valve seat 70 can be machined conveniently by insertion of an appropriate tool through the offset outlet opening 60. The vlave head 68 is carried, preferably relatively loosely, on a short stem 72 at the distal end of a crank arm 74 which has its opposite end secured for pivoting movement in response to rotation of an actuator shaft 76. As viewed in FIGS. 3 and 4, this actuator shaft 76 extends through a bushing 78 in an outer wall of the turbine housing 23 for connection to a crank link 80 pivotably connected to the end of a control rod 82. This control rod 82 is in turn coupled to a suitable turbocharger control actuator device, such as the type disclosed in commonly assigned U.S. Pat. Nos. 4,251,050 or 4,256,019, for axially displacing the rod 82 in response to selected system parameters to rotate the actuator shaft 76 about its own axis. This shaft rotation functions to pivot the crank arm 74 and thereby move the valve head 68 with respect to the valve seat 70 between a closed or seated position, as viewed in solid lines in FIG. 2, and an open position, as viewed in dotted lines in FIG. 2.

The actuator shaft 76 is positioned to extend generally transversely into the exducer passage 57 at a position generally at the juncture of the exducer passage 57 and the bypass passage 22, and generally between the bypass passage and the turbine wheel. In this position, the actuator shaft 76 is displaced axially to one side of the turbine wheel 16 where it does not substantially interfere with the flow of gases through the exducer passage. Moreover, the crank arm 74 and the valve head extend at the side of the exducer passage generally in parallel with the flow of exhaust gases through the exducer passage when the wastegate valve is closed so as not to interfere with or impede flow of exhaust gases from the turbine wheel to the outlet opening 60. However, when the wastegate valve is moved toward the open position, the crank arm 74 swings the valve head 60 angularly away from the bypass passage 22 to permit the bypassed exhaust gases to flow smoothly into the exducer passage 57 without substantially impeding the directional flow or velocity of the bypassed gases. That is, the valve head 68 moves toward the open position, as illustrated by the dotted lines in FIG. 2, wherein the valve head is disposed at all times in a plane extending angularly toward the outlet opening 60 regardless of the degree to which the valve head is moved off the valve seat. Thus, when the valve is partially opened, bypassed exhaust gases impacting the valve head 68 are deflected thereby in a downstream direction within the exducer passage 57 and not in an opposite direction toward the turbine wheel. In this manner, optimized operation of the fluid ejector is insured for optimum reduction of backpressure acting on the engine. In addition, when the wastegate valve is open, the valve head 68 is also oriented in a plane extending generally downstream with respect to the direction of gas flow through the exducer passage so as not to interfere substantially with gas flow through the exducer passage.

The bypass passage 22 and the wastegate valve 20 thus cooperate to provide an efficient fluid ejector for reducing backpressure on the engine when the valve 20 is in a partial or fully open position. This provision of an efficient fluid ejector is particularly desirable in that overall engine power and performance is increased without effecting the operation of the turbocharger. Importantly, in addition to its fluid ejector function, the wastegate valve 20 effectively regulates the flow of exhaust gases through the bypass passage 22 to control operation of the turbocharger in a normal manner.

According to further aspects of the invention, the turbine housing 23 advantageously includes an air vent 84 for passage of cooling ambient air transversely between the exducer and the bypass passage 57 and 22. More specifically, as viewed in FIGS. 2 and 4, the turbine housing 23 is cast to include separate tubular portions 85 and 86 respectively defining the bypass passage 22 and the exducer passage 57, wherein these tubular portions project in spaced relation to each other from the inlet passage 48 and the turbine wheel 16. The tubular portions 85 and 86 merge with each other immediately upstream of the outlet opening 60 for intermixing of their respective exhaust gas flows prior to passage into the outlet conduit 28. Importantly, the spacing of the tubular portions 85 and 86 defines the transversely open air vent 84 through which cooling ambient air may circulate to assist in cooling of the turbine housing. Accordingly, the air vent 84 interrupts the metal surfaces of the turbine housing between the bypass and exducer passages and thereby helps to prevent heat degradation of the metal surfaces which would otherwise be exposed on all sides to hot engine exhaust gases.

A variety of modifications and improvements to the invention described herein are believed to be apparent to one skilled in the art. Accordingly, no limitation on the invention is intended, except as set forth in the appended claims.

What is claimed is:

1. A turbine housing assembly for a turbocharger, comprising:

a turbine housing having formed therein an inlet passage for receiving exhaust gases from an engine, a volute passage for guiding the exhaust gases from the inlet passage into driving communication with a turbine wheel, an outlet opening, an exducer passage for guiding the exhaust gases from the turbine wheel to the outlet opening, and a bypass passage communicating between the inlet and exducer passages, said bypass passage having an outlet aperture oriented to open into said exducer passage generally in a downstream-facing direction; and a wastegate valve including a disk-shaped valve head carried by said turbine housing for selectively opening and closing said bypass passage outlet aperture to flow of exhaust gases, said valve head being movable about a pivot axis disposed generally within said exducer passage at a position generally between said bypass passage outlet aperture and said turbine wheel for movement of said valve head between a closed position oriented generally perpendicular to a central axis of said bypass passage outlet aperture and an open position in an orientation approaching parallelism with the bypass passage outlet aperture central axis whereby said valve head substantially avoids blockage of exhaust gases flowing through said bypass passage outlet aperture.

2. The turbine housing assembly of claim 1 wherein said turbine housing is formed as a unitary casting.

3. The turbine housing assembly of claim 2 wherein said turbine housing includes a first generally tubular member defining said bypass passage and a second generally tubular member defining said exducer passage, said first and second tubular members being spaced from each other over at least a portion of their lengths to define therebetween an air vent and merging with each other at the intersection of said bypass and exducer passages.

4. The turbine housing assembly of claim 1 wherein said bypass passage opens angularly into said exducer passage for angular intersection of exhaust gases flowing through said bypass passage with exhaust gases flowing through said exducer passage.

5. The turbine housing assembly of claim 1 wherein said valve head is mounted within said exducer passage.

6. The turbine housing assembly of claim 1 wherein said exducer passage includes an axially extending portion for receiving exhaust gases from the turbine wheel, and an angularly extending portion for guiding the exhaust gases from said axially extending portion to said outlet opening, said outlet opening having a central axis spaced laterally with respect to a central axis of said axially extending portion, and wherein said bypass passage outlet aperture opens into said angularly extending portion of said exducer passage for flow of exhaust gases through said bypass passage outlet aperture directly through said outlet opening substantially without change in direction of flow.

7. The turbine housing assembly of claim 6 wherein said wastegate valve comprises pivot means for pivotally moving said valve member, said pivot means being positioned within said angularly extending portion of said exducer passage generally between said axially extending portion and said bypass passage outlet aperture.

8. The turbine housing assembly of claim 7 wherein said pivot means is located at a position displaced to one side of said axially extending portion of said exducer passage.

9. The turbine housing assembly of claim 7 wherein said pivot means comprises an actuator shaft extending transversely into said exducer passage and mounted for rotation about its own axis, and a crank arm connected between said actuator shaft and said valve head, said crank arm being pivotally movable in response to rotation of said actuator shaft for moving said valve head to open said bypass passage outlet aperture.

10. The turbine housing assembly of claim 7 wherein said pivot means comprises means for pivotally moving said valve head to a plane when in a partially open position for deflecting exhaust gases flowing through said bypass passage outlet aperture in a downstream direction generally toward said outlet opening.

11. A turbine housing assembly for a turbocharger having a turbine wheel rotatably driven by exhaust gases expelled from a combustion engine, comprising:

a turbine housing having formed therein passage means for guiding the exhaust gases into driving communication with the turbine wheel, an outlet opening for discharge of the exhaust gases from said housing, an exducer passage for guiding the exhaust gases from the turbine wheel to the outlet opening, and a bypass passage for communicating a portion of the exhaust gases from said passage means to said exducer passage without driving communication with the turbine wheel, said bypass passage having an outlet aperture opening into said exducer passage in a generally downstream-facing direction; and a wastegate valve including a disk-shaped valve head carried by said turbine housing for selectively opening and closing said bypass passage outlet aperture, said valve head being movable about a pivot axis disposed generally within said exducer passage at a position generally between said bypass passage outlet aperture and said turbine wheel for movement of said valve head between a closed position oriented generally perpendicular to a central axis of said bypass passage outlet aperture and an open position in an orientation approaching parallelism with the bypass passage outlet aperture central axis whereby said valve head substantially avoids blockage of exhaust gases flowing through said bypass passage outlet aperture.

12. The turbine housing assembly of claim 11 wherein said turbine housing is formed as a unitary casting.

13. The turbine housing assembly of claim 12 wherein said turbine housing includes a first generally tubular member defining said bypass passage and a second generally tubular member defining said exducer passage, said first and second tubular members being spaced from each other over at least a portion of their lengths to define therebetween an air vent and merging with each other at the intersection of said bypass and exducer passages.

14. The turbine housing assembly of claim 11 wherein said exducer passage includes an axially extending portion for receiving exhaust gases from the turbine wheel and an angularly extending portion for guiding the exhaust gases from said axially extending portion to said outlet opening, said outlet opening having a central axis spaced laterally with respect to a central axis of said axially extending portion, and wherein said bypass passage outlet aperture opens into said angularly extending portion of said exducer passage for flow of exhaust gases through said bypass passage outlet aperture directly through said outlet opening substantially without change in direction of flow.

15. The turbine housing assembly of claim 14 wherein said wastegate valve comprises pivot means for pivotally moving said valve member, said pivot means being positioned within said angularly extending portion of said exducer passage generally between said axially extending portion and said bypass passage outlet aperture.

16. The turbine housing assembly of claim 15 wherein said pivot means comprises means for pivotally moving said valve head to a plane when in a partially open position for deflecting exhaust gases flowing through said bypass passage outlet aperture in a downstream direction generally toward said outlet opening.

17. A turbine housing assembly for a turbocharger having a turbine wheel rotatably driven by exhaust gases expelled from a combustion engine, comprising:

a turbine housing having formed therein passage means for guiding the exhaust gases into driving communication with the turbine wheel, an outlet opening for discharge of the exhaust gases from the turbine housing, an exducer passage having an axially extending portion into which exhaust gases pass from the turbine wheel and an angularly extending portion for guiding the exhaust gases from said axially extending portion to said outlet opening, and a bypass passage for guiding a portion of the exhaust gases from said passage means through a bypass passage outlet aperture into said angularly extending portion of said exducer passage with a flow into said exducer passage and through said outlet opening without substantial directional change; and a wastegate valve including a disk-shaped valve head carried by said turbine housing for selectively opening and closing said bypass passage outlet aperture, said valve head being movable about a pivot axis disposed generally within said angularly extending portion of said exducer passage at a position generally between said bypass passage outlet aperture and said axial portion of said exducer passage for movement of said valve head between a closed position oriented generally perpendicular to a central axis of said bypass passage outlet aperture and an open position in an orientation approaching parallelism with the bypass passage outlet aperture central axis whereby said valve head substantially avoids blockage of exhaust gases flowing through said bypass passage outlet aperture.

18. The turbine housing assembly of claim 17 wherein said turbine housing is formed as a unitary casting.

19. The turbine housing assembly of claim 18 wherein said turbine housing includes a first generally tubular member defining said bypass passage and a second generally tubular member defining said exducer passage, said first and second tubular members being spaced from each other over at least a portion of their lengths to define therebetween an air vent and merging with each other at the intersection of said bypass and exducer passages.

20. The turbine housing assembly of claim 17 wherein said outlet opening is aligned generally with the outlet aperture of said bypass passage.

21. A turbine housing assembly for a turbocharger having a turbine wheel rotatably driven by exhaust gases expelled from a combustion engine, comprising:
a turbine housing having formed therein passage means for guiding the exhaust gases into driving communication with the turbine wheel, an outlet opening for discharge of the exhaust gases from the turbine housing, an exducer passage having an axially extending portion into which exhaust gases pass from the turbine wheel and an angularly extending portion for guiding the exhaust gases from said axially extending portion to said outlet opening, and a bypass passage for guiding a portion of the exhaust gases from said passage means through a bypass passage outlet aperture into said angularly extending portion of said exducer passage with a flow into said exducer passage and through said outlet opening without substantial directional change; and
a wastegate valve carried by said turbine housing and including a disk-shaped valve head for selectively opening and closing said bypass passage outlet aperture, and pivot means positioned generally within said angularly extending portion of said exducer passage and generally between said axially extending portion of said exducer passage and said bypass passage outlet aperture for pivotally moving said valve member with respect to said bypass passage outlet aperture, said pivot means being generally spaced laterally with respect to said axially extending portion of said exducer passage to substantially avoid blockage of exhaust gases flowing through said axially extending portion.

22. The turbine housing assembly of claim 21 wherein said pivot means comprises means for pivotally moving said valve head to a plane when in a partially open position for deflecting exhaust gases flowing through said bypass passage outlet aperture in a downstream direction generally toward said outlet opening.

23. The turbine housing assembly of claim 21 wherein said turbine housing is formed as a unitary casting.

24. The turbine housing assembly of claim 21 wherein said turbine housing includes a first generally tubular member defining said bypass passage and a second generally tubular member defining said exducer passage, said first and second tubular members being spaced from each other over at least a portion of their lengths to define therebetween an air vent and merging with each other at the intersection of said bypass and exducer passages.

25. A unitary one-piece housing for a turbocharger having a turbine wheel rotatably driven by exhaust gases expelled from a combustion engine, comprising:
a primary housing portion defining passage means for guiding the exhaust gases into driving communication with the turbine wheel;
a first tubular member extending generally in an axial direction from said primary housing portion and defining an exducer passage into which the exhaust gases are discharged from the turbine wheel; and
a second tubular member extending generally in an axial direction from said primary housing portion and merging with said first tubular member and defining a bypass passage with an outlet aperture opening into said exducer passage for flow of a portion of the exhaust gases from said passage means into said exducer passage without driving communication with the turbine wheel, said second tubular member having an intermediate stretch spaced from said first tubular member to define therebetween a vent for circulation of ambient air.

26. The turbine housing of claim 25 wherein said first and second tubular members cooperate to define an outlet opening for flow of the exhaust gases from the turbine housing.

27. The turbine housing of claim 26 wherein said first tubular member is shaped to define an axially extending exducer passage portion for receiving exhaust gases from the turbine wheel and an angularly extending exducer passage portion for guiding the exhaust gases from said axially extending portion to said outlet opening.

28. The turbine housing of claim 27 wherein said second tubular member is shaped to define said bypass passage outlet aperture oriented for opening generally in a downstream-facing direction into said angularly extending exducer passage portion.

29. The turbine housing of claim 28 wherein said outlet opening is formed generally in alignment with the outlet aperture of said bypass passage for passage of gases through said bypass passage and further through said outlet opening substantially without directional change.

30. The turbine housing of claim 28 in combination with a wastegate valve carried by said turbine housing and including a valve member for selectively opening and closing said bypass passage outlet aperture, and pivot means positioned generally within said angularly extending portion of said exducer passage and generally between said axially extending portion of said exducer passage and said bypass passage outlet aperture for pivotally moving said valve member with respect to said bypass passage outlet aperture, said pivot means being generally spaced laterally with respect to said axially extending portion of said exducer passage to substantially avoid blockage of exhaust gases flowing through said axially extending portion.

31. The turbine housing of claim 30 wherein said valve member comprises a generally disk-shaped valve head, and wherein said pivot means comprises means for pivotally moving said valve head between a closed position closing said bypass passage outlet aperture and an open position opening said bypass passage outlet aperture, said valve head being oriented in a plane when in a partially open position for defelcting exhaust gases flowing through said bypass passage outlet aperture in a downstream direction generally toward said outlet opening.

32. A unitary one-piece turbine housing for a turbocharger having a turbine wheel rotatably driven by exhaust gases expelled from a combustion engine, comprising:
a primary housing portion defining passage means for guiding the exhaust gases into driving communication with the turbine wheel;
a first tubular member extending from said primary housing portion to define an exducer passage having an axially extending portion for receiving exhaust gases discharged from the turbine wheel and an angularly extending portion for receiving exhaust gases from said axially extending portion; and
a second tubular member extending generally in an axial direction from said primary housing portion and merging with said first tubular member and defining a bypass passage with an outlet aperture opening into said exducer passage for flow of a portion of the exhaust gases from said passage means generally in a downstream direction into said angularly extending portion of said exducer passage without driving communication with the turbine wheel, said second tubular member having an intermediate stretch spaced from said first tubular member to define therebetween a vent for circulation of ambient air.

33. The turbine housing of claim 32 wherein said first and second tubular members cooperate to define an outlet opening for flow of the exhaust gases from the turbine housing.

34. The turbine housing of claim 32 including a wastegate valve carried by said turbine housing and including a valve member for selectively opening and closing said bypass passage outlet aperture, and pivot means positioned generally within said angularly extending portion of said exducer passage and generally between said axially extending portion of said exducer passage and said bypass passage outlet aperture for pivotally moving said valve member with respect to said bypass passage outlet aperture, said pivot means being generally spaced laterally with respect to said axially extending portion of said exducer passage to substantially avoid blockage of exhaust gases flowing through said axially extending portion.

35. The turbine housing of claim 34 wherein said valve member comprises a generally disk-shaped valve head, and wherein said pivot means comprises means for pivotally moving said valve head between a closed position closing said bypass passage outlet aperture and an open position opening said bypass passage outlet aperture, said valve head being oriented in a plane when in a partially open position for deflecting exhaust gases flowing through said bypass passage outlet aperture in a downstream direction within said angularly extending portion of said exducer passage.

36. A unitary one-piece turbine housing for a turbocharger having a turbine wheel rotatably driven by exhaust gases expelled from a combustion engine, comprising:
a primary housing portion defining passage means for guiding the exhaust gases into driving communication with the turbine wheel;
a first tubular member extending from said primary housing portion to define an exducer passage having in inlet end for receiving exhaust gases discharged from the turbine wheel and an outlet end formed on a central axis spaced laterally with respect to a central axis of said inlet end; and
a second tubular member extending generally in an axial direction from said primary housing portion and merging with said first tubular member and defining a bypass passage with an outlet aperture opening into said exducer passage for flow of a portion of the exhaust gases from said passage means into said exducer passage without driving communication with the turbine wheel, said second tubular member having an intermediate stretch spaced from said first tubular member to define therebetween a vent for circulation of ambient air.

37. The turbine housing of claim 36 wherein said second tubular member is shaped to define said bypass passage opening generally in a downstream-facing direction into said exducer passage.

* * * * *